United States Patent [19]
Cook et al.

[11] Patent Number: 5,713,153
[45] Date of Patent: Feb. 3, 1998

[54] INSECT TRAP CONTAINING OLFACTORY LURE

[76] Inventors: John M. Cook, 264 E. Loyola Ave., Fresno, Calif. 93720-1637; Roy T. Cunningham, P.O. Box 4459, Hilo, Hi. 96720

[21] Appl. No.: 248,365

[22] Filed: May 24, 1994

[51] Int. Cl.⁶ .................................................. A01M 1/14
[52] U.S. Cl. ........................... 43/114; 43/115; 43/121
[58] Field of Search ............................ 43/114, 115, 121

[56] References Cited

U.S. PATENT DOCUMENTS

| | | | |
|---|---|---|---|
| 0,827,006 | 7/1906 | Gathmann | 43/115 |
| 3,023,539 | 3/1962 | Emerson | 43/114 |
| 3,708,908 | 1/1973 | Levey | 43/114 |
| 4,208,828 | 6/1980 | Hall et al. | 43/114 |
| 4,709,503 | 12/1987 | McQueen | 43/114 |
| 4,815,231 | 3/1989 | McQueen | 43/114 |
| 4,841,669 | 6/1989 | Demarest et al. | 43/131 |
| 4,876,822 | 10/1989 | White | 43/113 |
| 4,918,856 | 4/1990 | Olive et al. | 43/113 |
| 4,959,924 | 10/1990 | Martin | 43/114 |
| 5,044,112 | 9/1991 | Williams | 43/113 |
| 5,251,397 | 10/1993 | Exum et al. | 43/115 |
| 5,325,625 | 7/1994 | Liu | 43/114 |
| 5,384,981 | 1/1995 | Cohen | 43/114 |
| 5,438,792 | 8/1995 | Monett | 43/121 |

*Primary Examiner*—Kurt Rowan
*Attorney, Agent, or Firm*—Vance, Romero & Montague, P.S.

[57] ABSTRACT

Apparatus and processes for luring and trapping insects using an olfactory and/or visual attractant. The apparatus generally having a protective housing or frame, an olfactory attractant defining a lure, and at least one dual or multiple-sided adhesive panel. The housing or frame contains and protects the olfactory attractant and adhesive panel from contacting other surfaces and permits the adhesive panel to form at least a portion of an outwardly exposed or exterior surface of the trap apparatus.

23 Claims, 5 Drawing Sheets

INSECT TRAP CONTAINING OLFACTORY LURE

COPYRIGHT NOTICE

©Copyright 1994, James R. Vance. All Rights Reserved.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and processes for luring insects to a trap using an olfactory and/or visual attractant and trapping such insects.

BACKGROUND ART

It is often very important to estimate or calculate how many insects of a particular type are feeding within a specific area. Such estimates are used to determine where and when insecticide spraying should be commenced and terminated.

In addition, if the number of specifically identified insects exceed a predetermined value within a defined area, and the situation is severe enough, the results can be used to declare an economic and/or natural disaster. An example of insects which may be used in this regard are Gypsy Moths and fruit flies, including the Mediterranean Fruit Fly. For example, in 1988, it was discovered that extensive Mediterranean Fruit Fly populations throughout Southern California threatened a large portion of the citrus crop and associated industry. In effect, millions of dollars worth of precious fruit crops were at risk.

To prevent such disasters, various insect traps have been designed to lure insects therein and capture them.

Many traps take the form of a small cardboard box. One or more openings are placed within the opposed ends of the box to allow the insect to enter therein. An olfactory attractant or lure is placed within the cardboard box. The olfactory attractant commonly takes the form of an impregnated polymer or plastic material which defines a solid luring unit or pellet. The luring unit is usually placed within the trap near the middle of the trap. For example, the trap can be built to contain a little plastic basket within which is placed one or more of such luring units or pellets. In effect, the trap encases the luring units. However, sufficient space within the interior of the trap is provided to permit the ingress of insects therein.

The olfactory attractant within the pellets usually consists of a chemical that is specific to a particular type of insect or group of insects. The chemical used may attempt to approximate smells that the insects instinctively associate with the function of sexual reproduction.

It is preferable that the olfactory attractant be released over a long period of time. For example, the olfactory attractant may consist of chemicals known as pheromone and/or attractants. The polymeric or plastic matrix of the luring unit is usually designed to slowly release the lure therefrom over a number of days, weeks, or months as required.

An adhesive or sticky substance is placed upon the interior sidewalls of the box. It is anticipated that the insects will be attracted, allured, and enticed to the scent of the olfactory attractant. Since the attractant is located within the trap box, it is hoped that the insects will enter the box through either opening located at each end of the box. After entering the box, the insects contact and become adhered to the sticky substance placed upon the interior sidewalls of the box. Once adhered to the interior sidewalls of the box, the insects become trapped and die.

In other words, capture of the insect depends first upon the insect being attracted or allured to the trap. The attractant must further entice the insects to actually pass through the openings at either end of the trap and actually enter into the interior cavity of the trap. The insects must then make contact with the sticky substance placed upon the interior sidewalls of the box and become physically adhered to the sticky surface. Only after performing each of these steps or processes does the insect become trapped within the box.

The aforementioned trap is generally known as a Gypsy Moth Delta trap. Other insect traps include such well-known apparatus as the: Boll Weevil Scout trap, Jackson trap, Japanese beetle trap, McPhail trap, Pherocon 1C trap, Pherocon II trap, Pherocon AM trap, and Trogo trap.

In addition to the aforementioned traps, the inventors are also aware of the following disclosures related to insect trapping apparatus: Levey (U.S. Pat. No. 3,708,908, issued Jan. 9, 1973); Hall et al. (U.S. Pat. No. 4,208,828, issued Jun. 24, 1980); McQueen (U.S. Pat. No. 4,815,231, issued Mar. 28, 1989); Demarest et al. (U.S. Pat. No. 4,841,669, issued Jun. 27, 1989); and White (U.S. Pat. No. 4,876,822, issued Oct. 31, 1989).

The inventors believe that the listed devices taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventors are aware.

DISCLOSURE OF INVENTION

The present invention comprises useful, novel, and nonobvious apparatus and processes for luring insects to a trap and capturing such insects without necessarily requiring that the insects enter into an interior cavity of the trap. The trap of the present invention uses an olfactory and/or visual attractant, such as color and/or shape, to entice the insects thereto. The trap of the present invention maximizes the exposed contact surface area to which the insects may become adhered. Furthermore, the trap of the present invention comprises means to prevent surfaces located adjacent to the trap from becoming contaminated with the olfactory attractant and/or adhesive substance contained within the trap.

In essence, the present invention comprises extremely effective, simple, easily used, inexpensive apparatus and processes to attract and capture insects.

The apparatus of this invention are compact, functional, efficient, reliable, reusable, durable, rugged, easily constructed, and are inexpensive and economical to manufacture. The invention is simple to use and is extremely effective in capturing insects.

The present invention not only increases the speed and simplifies the procedure to construct, assemble, and install insect traps within a desired area, it also provides dramatically improved means to inspect, remove, clean, and recharge the trap. The apparatus requires minimal physical manipulation for assembly, installation, inspection, cleaning, and recharging.

The present invention may also remain in place at the test site, without being removed from the test location, and still permit inspection of the contents of the trap to be evaluated at a remote location.

In addition to the foregoing advantages and other advantages that will be described further below, the present invention also overcomes all of the previously mentioned disadvantages. For example, the present invention eliminates the need for complex, cumbersome, expensive, non-reusable insect traps that must be dismantled and destroyed to conduct an inspection of the contents of the traps. Nearly all insects that light upon and contact the trap of the present invention are captured, not just those insects that happen to enter into an interior cavity of the trap.

To achieve these general and specific objectives, the apparatus of the present invention generally comprises a protective housing or frame, an olfactory attractant defining a lure, and at least one dual or multiple-sided adhesive panel.

The olfactory attractant may comprise any desired material, chemical, shape, configuration, and/or color. For example, the olfactory attractant may take the form of an impregnated polymer or plastic material that defines a solid, semi-solid, or fluid luring unit. The luring unit can then be placed within the trap near the middle of the trap. If needed and/or desired, a separate housing may be provided to contain and house the luring unit.

The purpose of the olfactory attractant is emit a scent or plume to attract insects to the trap. The function of the olfactory attractant is not necessarily related to the adhesive capturing ability of the trap. What is important, however, is that the olfactory attractant be placed within the trap in a protected position and adjacent to the adhesive panel or panels.

For example, the olfactory attractant may comprise a liquid lure that is placed within a plastic vial. The vial is then placed within a protected area of the trap to prevent contact of the vial against environmental elements exterior to the trap. Within Europe, plastic vials have been used to contain liquid insect attractants. The plastic vials allow a slow release of the liquid attractant through the pores in the plastic, thereby, imparting a controlled release of the attractant.

Another extremely effective device for the controlled release of an attractant comprises a long hollow PVC tube having the liquid insect attractant lure sealed inside.

The present invention may be easily modified to utilize and of the aforementioned insect attractant lures.

Within the preferred embodiment of the invention, however, the olfactory attractant is generally defined by at least one attractant panel or curtain that is removably secured to the housing. The panel or curtain need not be planar in its configuration. Indeed, the panel may have a circular, cylindrical, serpentine, or other configuration, if desired.

The attractant panel can be either rigid or semi-rigid. It is important that the attractant panel has exposed opposed sides against which air may contact. Each side of the attractant panel should have an insect attracting substance thereon that is capable of activating olfactory senses of insects to lure the insects to the apparatus. It is preferred that the attractant panel has a substantially flat, planar, square or rectangular configuration.

Similar to the attractant panel, the adhesive panel is preferably made from a rigid or semi-rigid material. The adhesive panel or panels are covered or impregnated with an adhesive substance which enables the trap to capture the insect upon physical contact.

Within a very simple embodiment of the invention, a unitary housing or frame is used. For example, the housing may simply comprise a single block element having a single groove or channel therein. The housing or block engages and retains only one edge of a panel. The panel may comprise a rigid or semi-rigid board, sheet or card that is covered or impregnated with both an olfactory attractant to lure insects thereto and an adhesive substance to capture the insect upon physical contact therewith.

If more than one adhesive panel is used, the attractant panel is preferably juxtaposed between respective pairs of adhesive panels. As a result, the attractant panel will have a generally spaced, collateral orientation with respect to the adhesive panels located on either side thereof.

For example, in a slightly more complex embodiment of the invention, a dedicated attractant panel is covered or impregnated with an olfactory attractant to lure insects thereto. The attractant panel is placed within the aforementioned groove or channel. Then dedicated adhesive panels, which are nearly identical in size and shape with the aforementioned attractant panel, are placed on either side of the attractant panel in a spaced, generally parallel manner. The adhesive panels are then removably secured to the housing or block.

More particularly, within this embodiment of the invention, the two adhesive panels are removably secured to the outermost edges of the housing. Each side of the housing or block is provided with an upwardly projecting flange running the length of the housing. A clip, commonly found within stationery supplies, can then be used to secure the uppermost edge of the adhesive panels to their respective upwardly projecting flanges located on either side of the housing.

As a consequence of the aforementioned structure, the adhesive panels form a plurality of substantially planar sidewalls for the apparatus or trap. In addition, the trap is provided with dual or multiple-sided adhesive panels that can function to capture the insects. Both the exposed exterior sidewalls and the exposed interior sidewalls of the adhesive panels can be used to capture insects.

Within a more complex embodiment of the invention, each adhesive panel and attractant panel is at least partially held and retained within a framework. The respective frameworks for each panel have a generally fixed, spaced orientation one to another. The space between the respective frameworks permits air to pass over the surface of the attractant panel. The space between the respective frameworks also permits insects to enter therebetween to be captured by the exposed interior sidewalls of the adhesive panels.

If desired, the attractant panel may have one or more openings, holes, or orifices therein through which air may pass or circulate. Similarly, the adhesive panels could have one or more openings, holes, or orifices therein through which air may pass or circulate.

The specific structure of many different embodiments of the invention will be discussed in detail below within the Best Mode For Carrying Out The Invention portion of this document. Such disclosure is incorporated within this portion by this reference.

Heretofore, there were many different difficulties and/or disadvantages that were typically associated with insect traps. For example, it was not uncommon for the sticky surfaces and/or related scent attractants of the traps to accidentally or inadvertently contact and contaminate such items as the installer's hands, clothing, equipment, vehicle, containment box, exterior areas of the trap, attachment wires and strings, poles, surrounding leaves, branches, grass, and nearly every other object with which they could come in contact. As a consequence, numerous additional scent attracting sites other than the trap itself were created. This problem of multiple undesired attractant sites has occurred so frequently, that it is notoriously known within the science of trapping insects as the "ultimate" error.

The present invention is specifically designed to avoid the aforementioned problems. Compared to other insect traps heretofore known, the traps of the present invention significantly reduce the occurrence and amount of multiple attractant sites. The reason for this reduction is the structure of the housing or frame of the present invention and the placement of the adhesive panel or panels and olfactory attractant within the trap. More particularly, the traps of the present invention insulate the adhesive panels and olfactory attractant from such equipment and surrounding areas, thereby creating a single attractant site or location within the trap itself.

An additional problem of the prior art traps is that many insects will not actually enter into the trap. Instead, the insects simply light upon the exterior surface of the trap and will then fly away.

Although the traps of the present invention do have a protective housing, the traps are designed to have an "open" configuration. Both the exterior and the interior sides of the adhesive panels of the dual or multiple-sided trap can be used as effective insect capturing elements. Furthermore, the housing permits the adhesive panel or panels to form at least a portion of an outwardly exposed or exterior surface of the trap apparatus. Consequently, even if the insect only contacts the exterior surfaces of the trap, there is a great probability that the insect will be captured and will not escape.

Within the preferred embodiment of the present invention, four (4) different planar adhesive panels are provided that contain sticky surfaces to capture the attracted insect. Heretofore, only one (1) or two (2) sticky surfaces were used. The increased number of sticky panels is particularly important when the olfactory attractant is placed close to the sticky surface and is not mixed therein. If the insect enters into a passageway between the olfactory attractant and an adhesive panel, the probability of capturing the insect before touching the sticky surface is much higher where there are more sticky surfaces available, such as is the case in the present invention.

The present invention has many other distinguishing features over those of the known prior art. For example, heretofore and even currently, it is commonly understood that at specific time intervals, the whole trap must be removed from placement within the field to the field base station for insect identification. In addition, in most instances, the attracting chemical or pellet will last much longer than these required inspection and data gathering intervals.

In contrast, a further advantage of the present invention is that the olfactory attractant and sticky surfaces of the adhesive panel or panels can be replaced independently of each other. For example, the outer adhesive panels bearing the sticky surfaces can be removed at regular intervals and be replaced on site with new replacement adhesive panels. This allows the old or spent adhesive panels having the sticky surfaces thereon to be gathered to a field base station for inspection and identification of the insects captured. Consequently, the original traps can continue their operation even during such inspection and data gathering operations.

Where sticky panels of the prior art are stapled to the attracting device, removal of the staples usually damages the device, its holder, and/or its accompanying stake. It is also an arduous task to remove such staples if a large number of staples and/or traps are deployed.

The amount of time and corresponding costs to inspect and/or service the present invention are significantly reduced from that required by such prior art trap systems. Staples are not used within the present invention. Instead, the present invention is specifically designed to permit easy and quick removal and replacement of the adhesive panels and/or olfactory attractant panels, when necessary and/or desired.

According to the results of experimental testing, the present invention has shown far superior insect catching success than the less effective insect catching ability of other well-known and well-accepted insect traps.

The results of the experimental tests reveal that both the outer and inner surfaces of the adhesive panels of the present invention are catching approximately equal numbers of insects. Recently obtained relative test comparisons between several different insect traps give empirical quantification and verification that the present invention has significantly greater insect capturing ability than the other traps tested.

The insect traps of the present invention also double as both monitoring tools and eradication tools. The traps have extremely high capture rates, do not use toxicants, can be deployed quickly and easily, and use interchangeable components that can be stored, transported, and handled with a minimum amount of difficulty.

These and other objectives and advantages of the present invention will become more readily apparent upon reading the following disclosure and referring to the attached drawings.

One should understand that the drawings are not necessarily to scale and the elements are sometimes illustrated by graphic symbols, phantom lines, diagrammatic representations, and fragmentary views. In certain instances, the inventors may have omitted details that are not necessary for an understanding of the present invention or that render other details difficult to perceive.

BEST MODE FOR CARRYING OUT THE INVENTION

The following explanation describes a preferred embodiment and several different alternative embodiments of the invention. Referring to the drawings, wherein like numerals indicate like parts, apparatus 20 is used to attract, trap, and retain insects 22 for later inspection and disposal.

Apparatus 20 may be placed upon or removably secured to a wide variety of different support structures 24 to attract and capture a wide variety of flying and/or crawling insects, without contaminating the support structure 24 itself. For example, support structure 24 may comprise simply any underlying or elevated platform upon which apparatus 20 is placed or set. Alternatively, as partially illustrated in FIG. 1, apparatus 20 may be removably affixed to support structure 24 comprising one or more tree limbs, poles, sticks, roof overhangs or eaves of a building, and the like.

To accomplish the aforementioned objectives, apparatus 20 generally comprises a housing 26, at least one adhesive panel 28, and an insect attractant 30.

Housing 26 generally comprises a protective barrier, bumper, guard, frame or framework to prevent adhesive panel 28 and attractant 30 from contacting support structure 24 and/or other foreign objects and/or surfaces, such as tree trunks, limbs, branches, twigs, leaves, poles, vehicles, tools, equipment, laborers, and the like.

Figures 2, 3, 4:
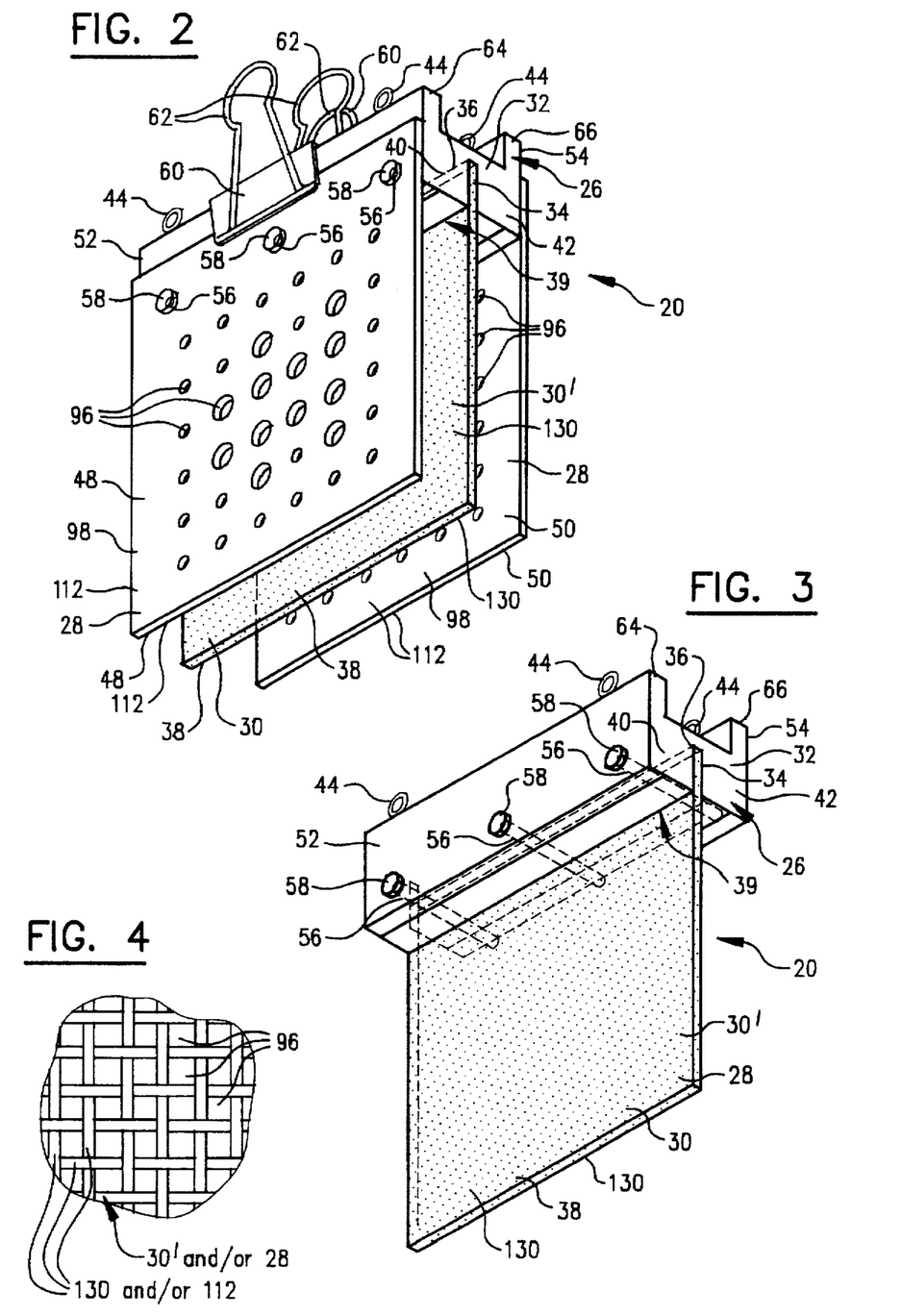
FIG. 2 is an isometric view of a second embodiment of the present invention.
FIG. 3 is an isometric view of a third embodiment of the present invention.
FIG. 4 is an enlarged, partial side-elevational view of an alternative embodiment of either the attractant panel and/or of the adhesive panel of the present invention.

FIG. 3 illustrates a very simplistic form of housing 26, wherein at least one framework element or block 32 receives and retains at least one edge portion of a panel 38. Block 32 may be made of wood, plastic, metal, or other material. Block 32 may be provided with a channel 34, groove, or recess within which an upper edge 36 of panel 38 may be received and retained.

Panel 38 may comprise either adhesive panel 28, attractant 30, and/or a combination of adhesive panel 28 and attractant 30. Within FIG. 3, panel 38 comprises a combination of adhesive panel 28 and attractant 30. Within FIG. 2, panel 38 comprises simply attractant 30.

Other means to removably secure adhesive panel 28 and attractant 30 may also or alternatively be used. For example, block 32 may be manufactured from flat metal sheets that are formed or bent to accomplish the objectives mentioned herein. For example, block 32 may be provided with flanges 40 and 42 located on either side of an upper portion 39 of panel 38. In effect, flanges 40 and 42 define or create channel 34 within which upper portion 39 of panel 38 is received and retained.

Another alternative means to removably secure panel 38 to housing 26 may include two or more blocks of wood or other material that are juxtaposed against opposed sides of upper portion 39 of panel 38 so that panel 38 is sandwiched therebetween.

If more than one panel 38 is used, housing 26 may also or alternatively include one or more spacer blocks (not shown) that are placed between the plurality of spaced panels 38 to prevent them from touching each other.

At this point in the discussion, panels 38 may comprise adhesive panel 28, attractant 30, or a combination of these two structural elements.

Although panels 38 are illustrated as having a generally planar square or rectangular configuration, it must be understood that adhesive panels 28 and attractant 30 may have a wide variety of different shapes and/or configurations. In addition, adhesive panels 28 and attractant 30 need not necessarily be planar. For example, if desired, attractant 30 and/or adhesive panels 28 may have a concave, convex, serpentine, or other contour.

Adhesive panel 28 and attractant 30 will be discussed in greater detail further below.

The general concept for housing 26 is that the vertically oriented panel or panels 38 be supported so that they do not contact each other or any other foreign object, except, of course, for insects 22.

Housing 26 as illustrated in FIG. 3 may be inverted or turned upside-down such that block 32 is set upon or removably affixed to an underlying support structure 24. Alternatively, housing 26 may have an orientation as illustrated in FIG. 3 such that block 32 is suspended from an elevated overhanging support structure 24. Consequently, panels 38 will hang downward in a generally vertical manner.

Apparatus 20 may also include any appropriate means for mounting housing 26 to support structure 24. For example, if housing 26 is to be hung or suspended from an elevated support structure 24, housing 26 may be provided with one or more eye hooks 44, screws, nails, hooks, or the like. A string 46, strap, wire, cord, chain, or the like may be secured to eye hook 44. String 46 may then be removably secured to the overhanging or elevated support structure 24 to suspend apparatus 20 in the air.

As illustrated in FIG. 2, the centrally located or middle panel 38 is secured within channel 34. Within this embodiment, the centrally located panel 38 defines attractant 30, or more particularly an attractant panel 30'. In addition to attractant panel 30', apparatus 20 also has a first adhesive panel 48 and a second adhesive panel 50 which are juxtaposed against respective opposed sides 52 and 54 of block 32. Consequently, block 32 may removably retain and hold a plurality of panels 48, 30', and 50, in a generally spaced, parallel, upright or vertical position.

Figure 1:
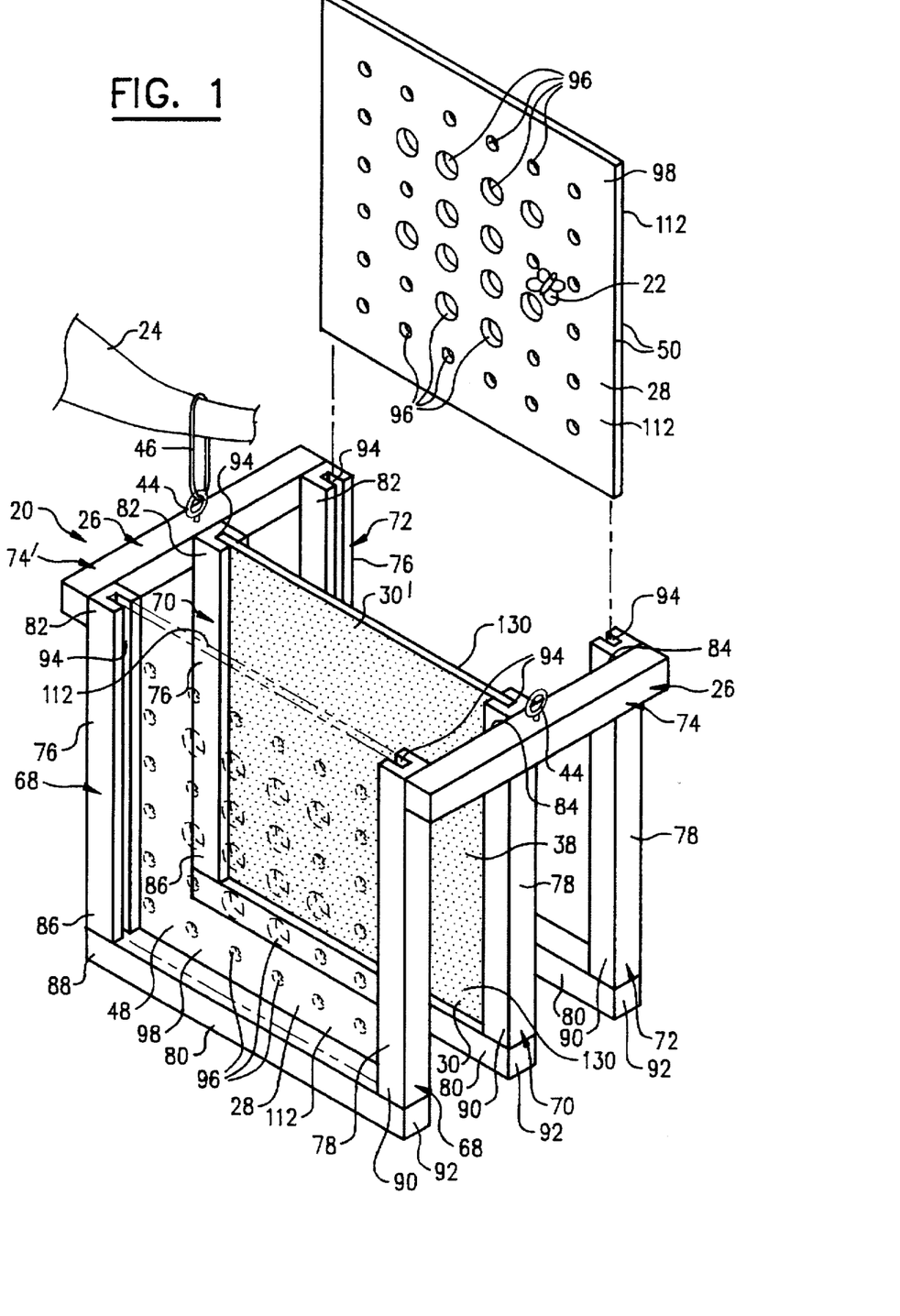
FIG. 1 is a partially exploded isometric view of a first embodiment of the present invention.

The embodiments shown in FIGS. 1 and 2 illustrate housing 26 retaining and holding three different, spaced panels; namely, first adhesive panel 48, attractant panel 30', and second adhesive panel 50, in that order.

Any appropriate means may be used to hold and retain first adhesive panel 48, attractant panel 30', and second adhesive panel 50 in a generally vertical manner having a spaced orientation one with another. For example, first adhesive panel 48, attractant panel 30', and second adhesive panel 50 may be removably secured to housing 26 by means of one or more pins 58, bolts, screws, nails, tacks, or clips.

More particularly, as best seen in FIG. 2, it is preferred that housing 26 be provided with bore holes 56 that pass therethrough. First adhesive panel 48, attractant panel 30', and second adhesive panel 50 are similarly provided with aligned, corresponding bore holes 56 through which one or more pins 58, bolts, nails, screws, rods, plugs, or the like may pass. Once bore holes 56 located within first adhesive panel 48, attractant panel 30', second adhesive panel 50, and block 32 are properly aligned, one or more pins 58 may pass therethrough to prevent the removal of first adhesive panel 48, attractant panel 30', and second adhesive panel 50 from housing 26. If pin 58 comprises a bolt, a nut or wing-nut may also be provided to removably secure the bolt to housing 26.

Similarly, within the more simpler embodiment as shown in FIG. 3, housing 26 could have bore holes 56 that pass therethrough. Aligned, corresponding bore holes are located within upper portion 39 of panel 38. Then one or more pins 58, bolts, nails, screws, rods, plugs, or the like may pass through the aligned corresponding bore holes 56 located within housing 26 and within panel 38 to removably secure panel 38 to housing 26.

Referring back to FIG. 2, in addition to or in leu of using pins 58, one or more clips 60 may be used to removably secure first adhesive panel 48 and second adhesive panel 50 to housing 26. For example, clips 60 may comprise specially designed clips manufactured especially for apparatus 20 or may simply be conventional spring steel binder clips that are commonly found within stationery supplies. In the case of common binder clips, each clip 60 is provided with a pair of hinged handles 62 that permit the attachment to and removal from housing 26 without requiring the removal of apparatus 20 from support structure 24 or the unnecessary handling of housing 26. Housing 26 may be further provided with upwardly and/or outwardly extending flanges 64 and 66 to which clips 60 may be easily and conveniently secured.

In essence, housing 26 as shown in FIG. 2 essentially functions as a spacer having clip-on devices or other means to removably secure first adhesive panel 48, attractant panel 30', and second adhesive panel 50 thereto. Preferably attractant panel 30' is placed or positioned between first adhesive panel 48 and second adhesive panel 50.

It should be readily apparent to the reader that other means for removably securing first and second adhesive panels 48 and 50 and attractant panel 30' to housing 26 may be used. Such other securing means are incorporated herein under the Doctrine of Equivalents.

Reference is now made to FIG. 1 which illustrates the preferred embodiment of the invention. FIG. 1 generally illustrates housing 26 as comprising a plurality of vertically suspended, partial braces, bumpers, barriers, guards, frames, trays and/or frameworks 68, 70, and 72. More particularly, FIG. 1 illustrates the use of a first framework 68, a second framework 70, and a third framework 72.

The structure and purpose of first framework 68, second framework 70, and third framework 72 are nearly identical. The only significant differences between frameworks 68, 70, and 72 are their placement within apparatus 20 and the type of panels that are held therein.

Each framework 68, 70, and 72 is generally positioned about a portion of the periphery of the panel it contains to retain and generally define an outermost perimeter for the contained panel. The first framework 68 holds and retains first adhesive panel 48. The middle or second framework 70 holds and retains attractant panel 30'. The last or third framework 72 holds and retains second adhesive panel 50.

Housing 26 prototypes of the invention were manufactured from machined wood. It should be kept in mind, however, that housing 26, including its frameworks 68, 70, and 72, and other structural elements, could be manufactured using an injection molding or other manufacturing process. In the preferred embodiment of the invention, frameworks 68, 70, and 72 are molded out of plastic or are made from extruded metal such as aluminum. Consequently, frameworks 68, 70, and 72 can be reused season after season, and are easily cleaned when necessary.

Furthermore, the various components of housing 26 may be manufactured so that they snap together. Such components may be removably or permanently secured to one another or they may be formed integrally therewith. For purposes of simplicity in explanation, the various components of housing 26 will be discussed as being separate elements that are secured to one another. Please keep in mind, however, that such elements are unitary in nature and purpose.

Frameworks 68, 70, and 72 are held in a fixed, spaced, generally parallel orientation with respect to each other by means of their connection to or integral formation with at least one elongated span bar 74, main support member, or brace. FIG. 1 actually illustrates the use of two span bars 74 and 74' or braces that are positioned at opposed ends of each framework 68, 70, and 72. The use of two span bars 74 and 74' imparts greater structural integrity to apparatus 20. The exact location of span bars 74 and 74' with respect to frameworks 68, 70, and 72 is not necessarily crucial. One of the primary objectives, however, is that frameworks 68, 70, and 72 be supported so that they have a generally vertical, spaced orientation one to another.

Each framework 68, 70, and 72 generally comprises an elongated first side rail 76, an elongated second side rail 78, and an elongate bottom rail 80 spanning therebetween. When apparatus 20 is in use, first side rail 76 and second side rail 78 have a generally upright or vertical orientation with respect to horizontal. An uppermost portion 82 of first side rail 76 is secured to span bar 74'. An uppermost portion 84 of second side rail 78 is secured to span bar 74. A lowermost portion 86 or lower end of first side rail 76 is secured to a first end 88 of bottom rail 80. Similarly, a lowermost portion 90 or lower end of second side rail 78 is secured to a second end 92 of bottom rail 80. Thus, each framework 68, 70, and 72 generally forms a three-legged structure that can be used as an outermost bumper, frame or framework for panels 48, 30', and 50.

A closer inspection of FIG. 1 reveals that each framework 68, 70, and 72 is provided with means for receiving and retaining at least one periphery edge of the panel or panels contained therein. For example, such receiving means may comprise a channel 94, groove, indentation and/or protrusion located within or about the interior sides of each first side rail 76 and each second side rail 78. Channels 94, in connection with first side rails 76, second side rails 78 and bottom rail 80, define a partial enclosure, compartment or tray within which at least a portion of one or more perimeter edges of panels 48, 30', and 50 may be received and retained.

More particularly, channels 94 within frameworks 68, 70, and 72 receive opposed sides of first adhesive panel 48, attractant panel 30', and second adhesive panel 50, respectively, to maintain their fixed relationship one to another. Specifically, first framework 68 receives and retains at least two periphery edges of first adhesive panel 48. Second framework 70 receives and retains at least two periphery edges of attractant panel 30'. Third framework 72 receives and retains at least two periphery edges of second adhesive panel 50. Furthermore, each framework 68, 70, and 72, which is located about the periphery of the retained panels 68, 30', and 70, respectively, prevents the retained panel from contacting support structure 24 and other foreign surfaces.

The preferred dimensions for frameworks 68, 70, and 72, as illustrated within FIG. 1, are approximately fifteen to twenty (15 to 20) centimeters by fifteen to twenty (15 to 20) centimeters square and are approximately one-half to two-and-one-half (½ to 2½) centimeters thick.

Similarly, first adhesive panel 48, attractant panel 30', and second adhesive panel 50 are approximately fifteen to twenty (15 to 20) centimeters by fifteen to twenty (15 to 20) centimeters square and are approximately one-half (½) of a centimeter thick. Of course, there should be a sufficient difference between the various dimensions of the components of apparatus 20 to permit the easy insertion and removal of first adhesive panel 48, attractant panel 30', and second adhesive panel 50 within the frameworks 68, 70, and 72, respectively.

It is important to note that housing 26, and more specifically frameworks 68, 70, and 72, hold first adhesive panel 48, attractant panel 30', and second adhesive panel 50 apart from one another, with a space therebetween. In other words, the first adhesive panel 48, attractant panel 30', and second adhesive panel 50 are held in a generally aligned, spaced apart, parallel relationship one to another with sufficient space or access passage therebetween to permit free or relatively unrestricted flow of air and passage of flying insects 22 therebetween. Such space is provided to permit insects 22 generally unobstructed passage between the respective panels. In effect, such spaces form and define interior passages or passageways.

Such passages, however, should not be so wide or far apart so that flying insects 22 do not contact an interior side of first adhesive panel 48 or an interior side of second adhesive panel 50.

The dimensions of housing 26, frameworks 68, 70, and 72, first adhesive panel 48, attractant panel 30', second adhesive panel 50, and the space therebetween may be modified as needed to accommodate the capture of differently sized insects 22.

Since bottom rail 80 serves or functions as a floor member or a stopping mechanism to prevent the further downward passage of panels 48, 30', and 50 contained within frameworks 68, 70, and 72, bottom rail 80 need not have a channel 94, groove, indentation and/or protrusion therein. However, if desired, such a channel 94 may also be provided within bottom rail 80.

In the preferred embodiment of the invention, frameworks 68, 70, and 72 do not have frame members that enclose or cover the uppermost portions of panels 48, 30', and 50. This allows panels 48, 30', and 50 to be simply dropped into place within frameworks 68, 70, and 72, and more particularly within channels 94 located therein. After panels 48, 30', and/or 50 are spent, they may be simply removed by raising them upwardly from the framed enclosure defined by first side rail 76, second side rail 78, and bottom rail 80 of their respective framework 68, 70, and/or 72.

Consequently, when removing adhesive panels 28 from apparatus 20 for inspection and disposal, an operator does not need to contend with or avoid any such uppermost rails (not shown) that could otherwise be located between uppermost portion 82 of first side rail 76 and uppermost portion 84 of second side rail 78. Although such uppermost rails could be provided, such rails are deliberately omitted in the preferred embodiment so that panels 28 can be removed without knocking off or damaging insects 22 that are adhered thereto.

If needed, additional support structures, braces and/or spacers can be placed between frameworks 68, 70, and 72 to further stabilize the spaced relationship of frameworks 68, 70, and 72 one to another.

It is preferred, however, to minimize the amount and volume of structure placed between the respect spaced panels 48, 30', and 50 By minimizing the amount and volume of support elements positioned between frameworks 68, 70, and 72, flying insects 22 are provided a greater amount of area or room between the respectively spaced panels 48, 30', and 50 for easy ingress of the insects 22 therebetween.

The entrance area for flying insects 22 to enter between successive panels 48, 30', and 50 is defined by nearly the, entire distance about the perimeter of frameworks 68, 70, and 72 multiplied by the distance between respective frameworks 68, 70, and 72. It is important to note that the amount of area through which insects 22 could pass to enter between successive panels 48, 30', and 50, is significantly larger with the present invention than with the insect traps heretofore known.

In addition, nearly the entire surface areas between respectively faced panels 48, 30', and 50 are available for adhesive contact between flying insects 22 and such panels.

The particular design of adhesive panels 28 and housing 26 also permits nearly one entire side of each adhesive panel 28 to be outwardly exposed and thereby define an exterior surface of apparatus 20 against which flying insects may contact and become trapped without even having to enter into the aforementioned passageway.

The discussion will now be directed toward adhesive panel 28, first adhesive panel 48, second adhesive panel 50, attractant 30, attractant panel 30', and panel 38.

As previously stated, at least one adhesive panel 28 is removably secured to housing 26. Adhesive panel 28 may be rigid or semi-rigid. For example, adhesive panel 28 may comprise a relatively stiff absorbent board, pad or sheet that has an insecticidal composition applied thereto or impregnated therein. It is not necessary, however, that an insecticidal composition be used.

Adhesive panel 28 substantially defines a dual or multiple-sided panel, wherein at least two sides can be exposed to insects 22. Each side of adhesive panel 28 has a sticky, tacky or adhesive substance located thereon which is capable of capturing and retaining insects 22 that contact it.

Although adhesive panel 28 may take many different shapes or configurations, it is preferred that adhesive panel 28 have a substantially flat, planar, square or rectangular configuration. A flat, planar, square or rectangular configuration makes things simpler throughout the manufacturing process.

As mentioned above, adhesive panel 28 may comprise first adhesive panel 48 and second adhesive panel 50, each of which are removably secured to housing 26. First adhesive panel 48 preferably has a generally spaced, collateral orientation with respect to second adhesive panel 50.

Adhesive panel 28 or panels 48 and 50 form a substantial portion of the outwardly exposed exterior surface of apparatus 20. Consequently, the trapping effectiveness of apparatus 20 is greatly enhanced. The exterior surfaces of panels 28 may continue their unobstructed performance of capturing insects 22 even if the interior surfaces of panels 28 become congested with captured insects 22.

As seen in FIGS. 1 and 2, adhesive panels 28, and more particularly first adhesive panel 48 and second adhesive panel 50, each may have one or more holes 96, openings, orifices, or perforations therein through which air may pass or circulate. Holes 96 permit air to pass through the adhesive panels 28. Consequently, air carrying odors intended to activate the olfactory senses of insects 22 may pass from near attractant panel 30' outwardly from apparatus 20; and more particularly, outward from between panels 28 and attractant 30, and also outward through holes 96 located within panels 28.

Within the preferred embodiment of the invention, adhesive panel 28 comprises card 98. Card 98 may be manufactured from any rigid or semi-rigid material, such as paper, paperboard, cardboard, masonite, plastic, or any other appropriate material. Card 98 may have a porous composition that enables greater capability to receive and retain an adhesive substance 112.

Card 98 may have a fold-over design. For example, card 98 may have a length that is approximately twice the length that is required. A first side 100 of card 98 is covered with adhesive substance 112, such as with a product sold under the trademark STIKEM or STICKUM. An opposed second side 102 is not covered with any adhesive substance.

Figure 6:
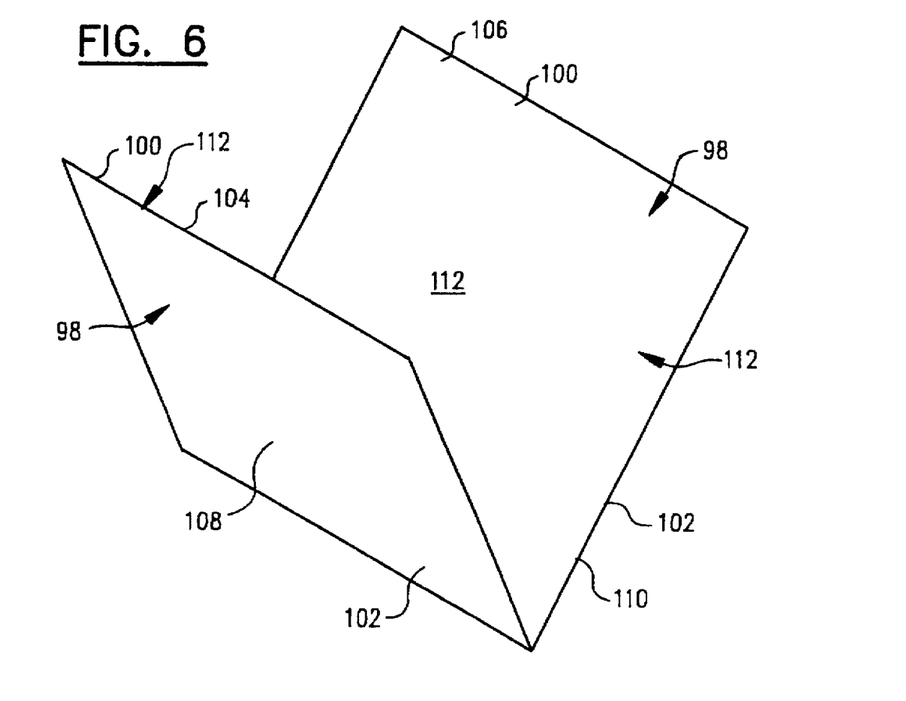
FIG. 6 is an isometric view of an adhesive card that defines a reversible adhesive panel, wherein the adhesive card is generally shown in an inoperative position.

Card 98 can be manufactured and shipped so that card 98 is folded in half with the adhesive substance 112 on each folded portion facing each other or being juxtaposed against each other, as generally shown in FIG. 6. Thus, when card 98 is handled, the non-sticky second side 102 can be contacted without contamination of the operator or other equipment.

Figure 7:
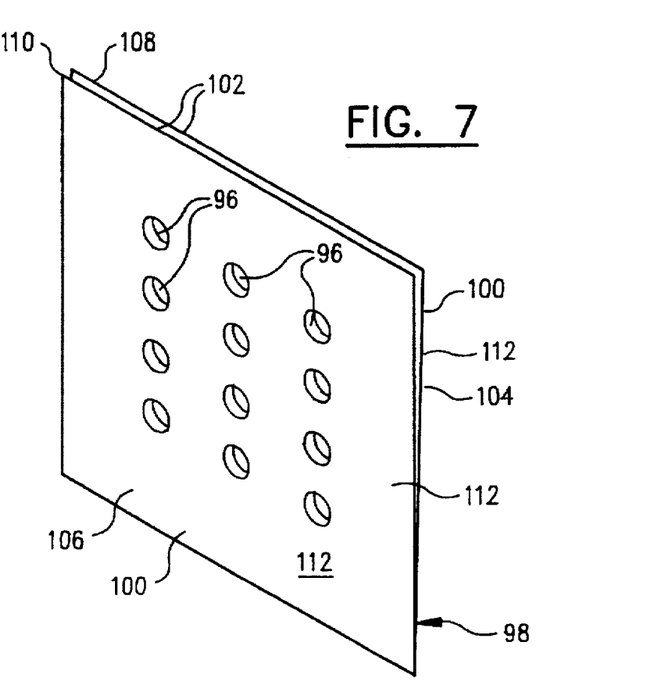
FIG. 7 is an isometric view of the adhesive card of FIG. 6, wherein the adhesive card is reversed to assume an operative position.

Prior to placement within housing 26, the folded card 98 is pried apart and the fold is reversed. This exposes the two sticky surfaces outwardly, as shown in FIG. 7, and card 98 is properly positioned within housing 26. Some foldable paperboard panels having a substance called STIKEM thereon are already available in the marketplace but are not used as herein described. Such boards could be manufactured in substantial quantities to bring down their cost. A more specific description of this feature follows.

First side 100 of card 98 would have a first portion 104 and a second portion 106. Similarly, second side 102 has a corresponding first portion 108 and a second portion 110.

Adhesive substance 112 is applied to both first portion 104 and to second portion 106. Consequently, card 98 can be folded from a generally flat position to an inoperative closed position for storage and transport. When card 98 assumes its closed position, adhesive substance 112 is not substantially exposed. For example, when card 98 assumes its closed position, first portion 104 and second portion 106 of first side 100, which bear adhesive substance 112 thereon, are juxtaposed against or near to each other. As a result, when card 98 is in its closed position, first portion 108 and second portion 110 of second side 102 are oriented in an outwardly exposed nonadhesive manner on opposed sides of adhesive panel 28.

A sheet of wax paper, tinfoil, or other separating means (not shown) may be provided between first portion 104 and second portion 106 of first side 100, when card 98 assumes its closed position. Such separating means are intended to facilitate easy separation of first portion 104 away from second portion 106.

When desired, first portion 104 and second portion 106 of first side 100 can be pulled apart so that card 98 is folded to an operative open position. When in its operative open position, adhesive substance 112 on first portion 104 and on second portion 106 of first side 100 is exposed to permit the capture of insects 22. In other words, when card 98 assumes its open position, adhesive substance 112 on first and second portions 104 and 106 is substantially exposed to flying and/or crawling insects 22 in an exposed adhesive manner on opposed sides of adhesive panel 28. In turn, first and second portions 108 and 110 of second side 102 are juxtaposed against or near to each other when card 98 assumes its open position.

It is preferred that adhesive substance 112 comprises a tacky or sticky substance, such as a product currently sold under the trademark STIKEM or STICKUM. Once adhesive panels 48 and 50 are coated with adhesive substance 112, such panels become an active part of the trapping mechanism. It is important to note that the outwardly exposed, exterior faces or sides of adhesive panels 48 and 50 are covered with the adhesive substance 112. In addition, the inwardly exposed, interior faces or sides of adhesive panels 48 and 50 are also covered with the adhesive substance 112.

FIG. 6 illustrates card 98 without bore holes 96 therein. However, FIG. 7 illustrates card 98 having bore holes 96.

The present invention has a special benefit in permitting its continued use after a spent adhesive panel 28 is replaced with a new adhesive panel 28. Furthermore, replacement of adhesive panel 28 does not necessarily require the replacement of the olfactory attractant 30 or attractant panel 30'.

Replacement of the olfactory attractant 30 or attractant panel 30' does not necessarily require the replacement of adhesive panel 28 or panels 48 and/or 50.

It must be kept in mind, however, that within a simpler embodiment of the invention, as illustrated in FIG. 3, attractant 30 can be incorporated into adhesive substance 112. Alternatively and preferably, as illustrated in FIGS. 1 and 2, attractant 30 can be provided separately from adhesive panels 48 and 50.

As illustrated in FIG. 1, adhesive panels 48 and 50 and attractant panel 30' are preferably retained within frameworks 68, 72, and 70 by gravity. Alternatively, or in addition to the gravity retention, frictional resistance between the edges of panels 48, 50, and 30', and the interior sidewalls of channels 94 may properly retain panels 48, 50, and 30' at a desired location. Each panel 48, 50, and 30' is supported on three sides or edges by the corresponding framework 68, 72 or 70.

If desired, other means, such as latches, locks, snaps, toggles, pins, screws, nails, bolts, tacks, staples, and the like may also or alternatively be used to secure and retain panels 48, 50, and 30' within frameworks 68, 72, and 70, respectively.

As seen in FIGS. 1 and 2, attractant panel 30' is positioned near a central or middle location of the trap enclosure. Adhesive panels 48 and 50 are positioned outwardly to either side of attractant panel 30'. As mentioned above, adhesive panels 48 and 50 have an adhesive, tacky and/or sticky surface on both faces or sides thereof.

It is preferred that both faces or sides of attractant 30, and more specifically attractant panel 30', are provided with an insect attractant that is capable of producing or emitting an odor to activate olfactory senses of insects 22 to lure insects 22 to apparatus 20. In essence, attractant 30 defines an odor-producing or odor-emitting olfactory attractant or lure for insects 22.

In the preferred embodiment of the invention, attractant 30 comprises a polymer matrix weighing about eight-five (85) grams and contains about twenty (20) grams of Trimedlure. An attractant panel 30' having this composition will dispense Trimedlure effectively into surrounding ambient airflow for a period of approximately four (4) to five (5) months. After approximately four (4) months of exposed use, it is anticipated that attractant panel 30' will be replaced.

Figure 5:
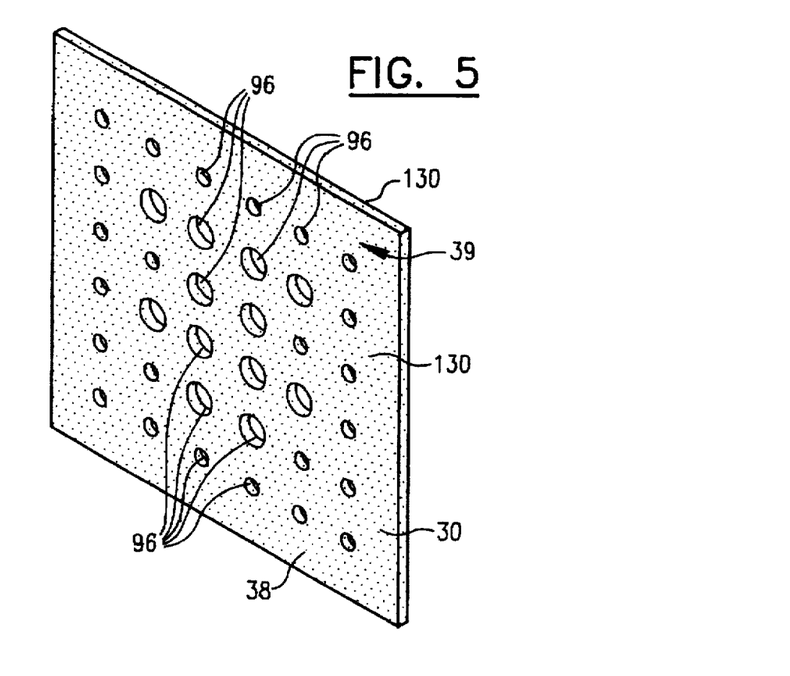
FIG. 5 is an isometric view of a further embodiment of either the attractant panel and/or of the adhesive panel of the present invention.

As shown in FIGS. 2, 3, and 5, although not absolutely necessary, attractant panel 30' could be either solid or have holes 96 or perforations therein. If attractant panel 30' is provided with holes 96, it is anticipated that an increased amount of airflow will occur past insect attractant 30. If adhesive panels 28 are also provided with a plurality of holes 96 or apertures therein, similar to an appearance of Swiss cheese, an increased amount of airflow will occur. Consequently, attractant panel 30' containing the Trimedlure substance can operate more efficiently.

As illustrated in FIG. 4, in an alternative embodiment of the invention, attractant panel 30' and/or adhesive panels 28 can be manufactured from sheets of coarse screening material that are coated on both sides. Attractant panels 30' are coated with attractant 30, such as with Trimedlure. Adhesive panels 28 are coated with adhesive substance 112, such as STIKEM.

Figure 8:
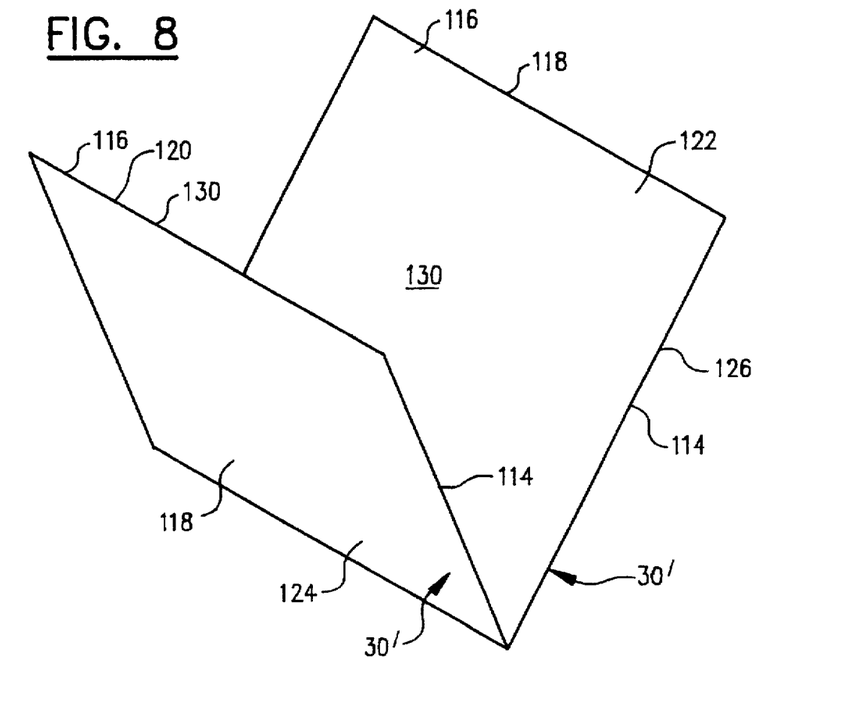
FIG. 8 is an isometric view of an attractant card that defines a reversible attractant panel, wherein the attractant card is generally shown in an inoperative position.
Figure 9:
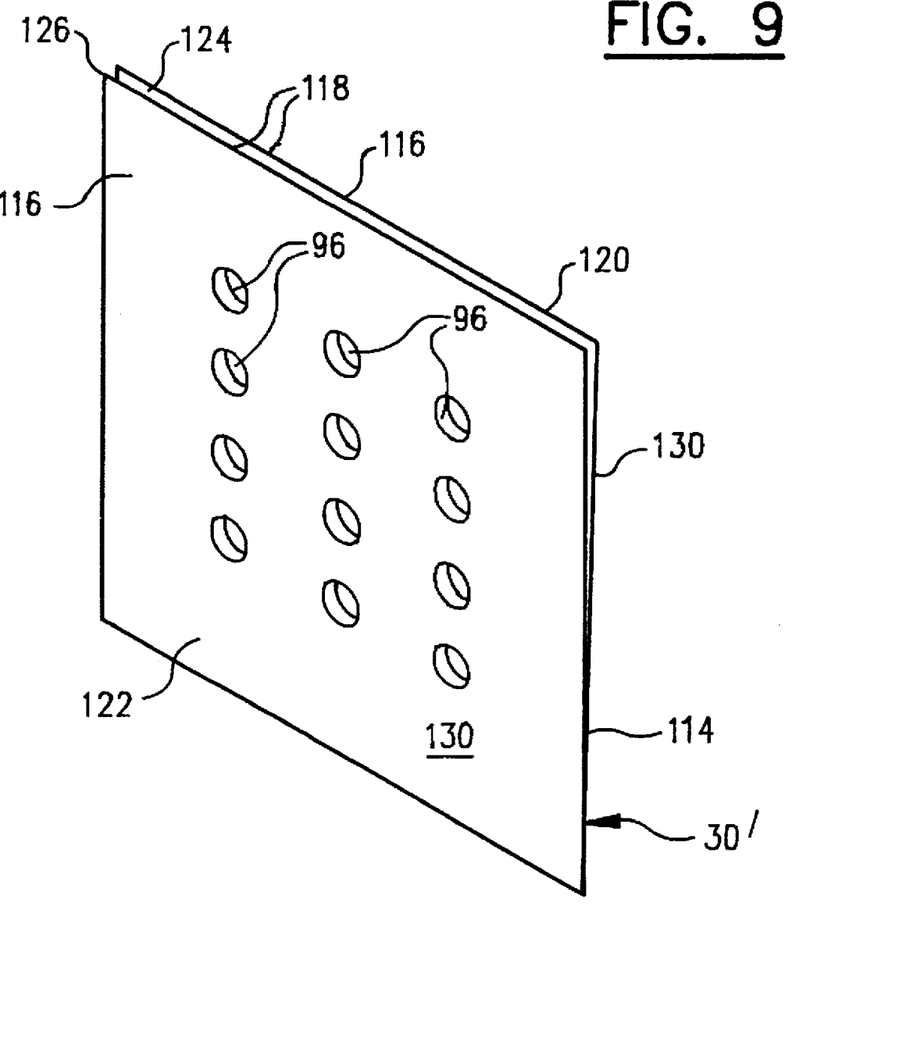
FIG. 9 is an isometric view of the attractant card of FIG. 8, wherein the attractant card is reversed to assume an operative position.

Reference is now made to FIGS. 8 and 9. Similar to the discussion above concerning card 98, attractant panel 30' may also comprise a paper, cardboard or plastic olfactory card 114. For example, olfactory card 114 may have a first side 116 and an opposed second side 118. First side 116 may have a first portion 120 and a second portion 122. Second side 118 also has a first portion 124 and a second portion 126. An attractant 30 or attractant substance 130 is applied to both first portion 120 and to second portion 122 of first side 116. The attractant substance 130 is not applied to any surface of second side 118.

Similar to card 98, olfactory card 114 may be folded so that first portion 120 and second portion 122 of first side 116 face each other, as shown in FIG. 8. Within this position, olfactory card 114 assumes a substantially inoperative closed position for storage and transport. When olfactory card 114 is in its closed position, the attractant substance 130 is substantially not exposed.

First portion 120 and second portion 122 of olfactory card 114 can then be pried apart and separated. The fold may then be reversed so that olfactory card 114 assumes an operative open position, as shown in FIG. 9, to lure insects 22 thereto. Within its operative open position, the attractant substance 130 on first portion 120 and second portion 122 is exposed to air currents and air circulation. The first and second portions 124 and 126 of second side 118 are juxtaposed against or near to each other when olfactory card 114 assumes its operative open position.

Although adhesive panels 48 and 50 are removed periodically for inspection, such panels are only replaced at the discretion of the operator, project director, or staff.

It is anticipated that in areas of a high density insect infestation, numerous apparatus 20 will be deployed in a spaced, randomly disbursed manner throughout the infested area.

Two or three inspections of each deployed apparatus 20 should initially be taken at relatively short time period intervals, and the information obtained from each apparatus 20 is recorded. After an initial preliminary determination of the insect infestation, each deployed apparatus 20 should be routinely inspected at approximately six (6) to seven (7) day intervals. During each inspection, a count is made to determine the insect capture rate or density relative to the appropriate time interval between inspections.

Some inspection counts may be very high due to insect population peaks. Another inspection period may reveal counts that are much lower. Each device, however, is exposed to the same open air conditions. Consequently, a relative comparison can be made for deployed apparatus and inspection sites.

It is important that both the interior and exterior sides of adhesive panels 28 be inspected. During testing of the present invention, it was discovered that the interior surfaces of the adhesive panels 28 were capturing nearly an equivalent number of insects 22 as compared to the number of insects 22 captured by the exterior sides of the adhesive panels 28.

In a further alternative embodiment of the invention, adhesive panels 48 and 50 are specifically manufactured to include built-in frameworks 68 and 72, respectively.

When in full manufacturing production, it is anticipated that adhesive panels 28 will be placed within thin plastic frames (not shown) and be precoated with adhesive substance 112 at the factory. Panels 28 would then be packaged by placing them in cardboard or plastic ridge dividers (not shown) located within cartons. The cardboard or plastic ridge dividers would hold approximately twenty-five (25), fifty (50), or one hundred (100) adhesive panels 28 per box or carton. The cardboard or plastic ridge dividers would hold adhesive panels 28 in a generally upright manner without touching one another.

The very same cartons and cardboard or plastic ridge dividers could be used to retrieve spent adhesive panels 28 for returning such panels 28 to a field base for inspection. The previously mentioned thin frame of each adhesive panel 28, or alternatively the carton construction, could provide identification spaces to write on to log the origin or location of such spent adhesive panels 28.

The attractant panels 30' containing the Trimedlure substance could be similarly packaged.

Use of uniform packaging, cartons, and inserts will enhance the cost efficiency of using the invention over the known prior art. If desired, the cartons and inserts can be reused. Shipping and storage density will also be enhanced.

Housing 26 could be packaged and shipped in bulk separately from the panels 28 and 30'.

In addition to using an olfactory attractant 30, adhesive panels 28, housing 26, and/or adhesive substance 112 may be manufactured from a material having a color that is instinctively visually attractive to insects 22, to further lure insects 22 to apparatus 20. Indeed, the visual aspects of a trap can be very important. Color for example can enhance the attractancy of the overall system. For example, it is said that Medflys are attracted to yellow.

Similarly, the shape or configuration of a trap can significantly effect the efficiency of a trap. In some cases, shape is extremely important in capturing specific species of insects.

The means and construction disclosed herein are by way of example and comprise primarily the preferred forms of putting the invention into effect. Although the drawings depict preferred and alternative embodiments of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventors claim the invention in all of its forms, including all alternatives, modifications, equivalents, and alternative embodiments that fall within the legitimate and valid scope of the appended claims, appropriately interpreted under the Doctrine of Equivalents.

INDUSTRIAL APPLICABILITY

The present invention may be used by fruit and/or vegetable growers, farmers, park rangers, arboriculturists, researchers, and other occupations and professions to effectively and efficiently attract and capture a wide variety of insects. In essence, the present invention may be used wherever simple, reliable, easily used apparatus and processes are needed to provide reliable and accurate information concerning the degree of insect infestation within a particular area or region.

What is claimed is:

1. An apparatus for attracting and trapping insects and retaining the insects for later inspection and disposal, said apparatus capable of being placed upon or removably secured to a support structure, said apparatus comprising:

(a) a housing;

(b) at least one adhesive panel removably secured to said housing, said adhesive panel being rigid or semi-rigid, said adhesive panel substantially defining a dual or multiple-sided adhesive panel wherein at least two sides can be exposed to the insects, each of said sides of said adhesive panel having a sticky, tacky or adhesive substance thereon capable of capturing and retaining the insects that contact therewith, said adhesive panel forming a substantial portion of an outwardly exposed exterior surface of said apparatus; and (c) an insect attractant removably secured to said housing, said attractant capable of emitting an odor to activate olfactory senses of the insects to lure the insects to said apparatus, said attractant being either incorporated into said adhesive substance or being provided separate therefrom, said housing protecting said adhesive panel and said attractant from contacting the support structure and other foreign surfaces, at least one side of said adhesive panel having said sticky, tacky or adhesive substance thereon facing outwardly to define a portion of said outwardly exposed exterior surface of said apparatus, said adhesive panel having a first adhesive panel and a second adhesive panel each of which are removably secured to said housing, said first adhesive panel having a generally spaced, collateral orientation with respect to said second adhesive panel said attractant at least one attractant panel removably secured to said housing, said attractant panel being rigid or semi-rigid, said attractant panel having exposed opposed sides, each of said sides of said attractant panel having an attractant substance thereon capable of activating olfactory senses of the insects to lure the insects to said apparatus, said attractant panel being juxtaposed between said first adhesive panel and said second adhesive panel, said attractant panel having a generally spaced, collateral orientation with respect to said first adhesive panel and with respect to said second adhesive panel.

2. The apparatus of claim 1, wherein said adhesive panel has a substantially flat, planar, square or rectangular configuration.

3. The apparatus of claim 1, wherein said adhesive panel has at least one opening, hole, or orifice therein through which air may pass or circulate.

4. The apparatus of claim 1, wherein said first adhesive panel and said second adhesive panel each have at least one opening, hole, or orifice therein through which air may pass or circulate.

5. The apparatus of claim 1, wherein said adhesive panel comprises a paper, cardboard or plastic card, said card having a first side and an opposed second side, said first side having a first portion and a second portion, said second side having a corresponding first portion and a corresponding second portion, said adhesive substance being applied to both said first portion and to said second portion of said first side, said card capable of being folded to an inoperative closed position for storage and transport, said adhesive substance substantially not being exposed when said card assumes said closed position, said adhesive substance on said first portion and on said second portion of said first side being juxtaposed against or near to each other when said card assumes said closed position, said first portion and said second portion of said second side being positioned in an exposed nonadhesive manner on opposed sides of said adhesive panel when said card is in said closed position, said card capable of being folded to an operative open position for capturing insects, said adhesive substance substantially being exposed when said card assumes said open position, said first portion and said second portion of said second side being juxtaposed against or near to each other when said card assumes said open position, said adhesive substance on said first portion and on said second portion of said first side being positioned in an exposed adhesive manner on opposed sides of said adhesive panel when said card is in said open position.

6. The apparatus of claim 1, wherein said attractant panel has a substantially flat, planar, square or rectangular configuration.

7. The apparatus of claim 1, wherein said attractant panel comprises at least one opening, hole, or orifice therein through which air may pass or circulate.

8. The apparatus of claim 1, wherein said adhesive panel comprises a first adhesive panel and a second adhesive panel each of which are removably secured to said housing, said first adhesive panel having a generally spaced, collateral orientation with respect to said second adhesive panel, said first adhesive panel said second adhesive panel, and said attractant panel each have at least one opening, hole, or orifice therein through which air may pass or circulate.

9. The apparatus of claim 1, wherein said attractant panel comprises a paper, cardboard or plastic olfactory card, said olfactory card having a first side and an opposed second side, said first side having a first portion and a second portion, said second side having a corresponding first portion and a corresponding second portion, said attractant substance being applied to both said first portion and to said second portion of said first side, said olfactory card capable of being folded to a substantially inoperative closed position for storage and transport, said attractant substance substantially not being exposed when said olfactory card assumes said closed position, said attractant substance on said first portion and on said second portion of said first side being juxtaposed against or near to each other when said olfactory card assumes said closed position, said first portion and said second portion of said second side being positioned in an exposed non-attractant manner on opposed sides of said attractant panel when said olfactory card is in said closed position, said olfactory card capable of being folded to an operative open position for luring insects, said attractant substance substantially being exposed to air circulation when said olfactory card assumes said open position, said first portion and said second portion of said second side being juxtaposed against or near to each other when said olfactory card assumes said open position, said attractant substance on said first portion and on said second portion of said first side being positioned in an exposed operative manner on opposed sides of said attractant panel when said olfactory card is in said open position.

10. The apparatus of claim 1, wherein said attractant substance comprises Trimedlure.

11. The apparatus of claim 1, wherein said housing defines a framework, barrier, guard or bumper positioned about a periphery of said adhesive panel to prevent said adhesive panel from contacting the support structure and other foreign surfaces.

12. The apparatus of claim 1, wherein said housing defines a framework, barrier, guard or bumper positioned about a periphery of said attractant panel to prevent said attractant panel from contacting the support structure and other foreign surfaces.

13. The apparatus of claim 1, wherein said adhesive panel and said attractant are removably secured to said housing by means of a bolt, pin, screw, nail, tack, or clip.

14. The apparatus of claim 1, wherein said housing is constructed of wood, plastic, or metal.

15. The apparatus of claim 1, further comprising means for mounting said housing to the support structure or suspending said housing from the support structure.

16. An apparatus for attracting and trapping insects and retaining the insects for later inspection and disposal, said apparatus capable of being placed upon or removably secured to a support structure, said apparatus comprising:

(a) a housing;

(b) at least one adhesive panel removably secured to said housing, said adhesive panel being rigid or semi-rigid, said adhesive panel substantially defining a dual or multiple-sided adhesive panel wherein at least two sides can be exposed to the insects, each of said sides of said adhesive panel having a sticky, tacky or adhesive substance thereon capable of capturing and retaining the insects that contact therewith, said adhesive panel forming a substantial portion of an outwardly exposed exterior surface of said apparatus; and (c) an insect attractant removably secured to said housing, said attractant capable of emitting an odor to activate olfactory senses of the insects to lure the insects to said apparatus, said attractant being either incorporated into said adhesive substance or being provided separate therefrom, said housing protecting said adhesive panel and said attractant from contacting the support structure and other foreign surfaces, at least one side of said adhesive panel having said sticky, tacky or adhesive substance thereon facing outwardly to define a portion of said outwardly exposed exterior surface of said apparatus;

(d) wherein said attractant has at least one attractant panel removably secured to said housing, said attractant panel being rigid or semi-rigid, said attractant panel having exposed opposed sides, each of said sides of said attractant panel having an attractant substance thereon capable of activating olfactory senses of the insects to lure the insects to said apparatus;

(e) wherein said adhesive panel has a first adhesive panel and a second adhesive panel each of which are removably secured to said housing, said first adhesive panel having a generally spaced, collateral orientation with respect to said second adhesive panel;

(f) wherein said housing has
   (i) an elongated main support member or span bar;
   (ii) a first framework, barrier, guard or bumper connected to or formed integrally with said main support member, said first framework having a channel, groove, or receiving means therein capable of receiving and retaining at least one periphery edge of a first adhesive panel to prevent said first adhesive panel from contacting the support structure and other foreign surfaces;
   (iii) a second framework, barrier, guard or bumper connected to or formed integrally with said main support member, said second framework having a channel, groove, or receiving means therein capable of receiving and retaining at least one periphery edge of said attractant to prevent said attractant from contacting the support structure and other foreign surfaces; and
   (iv) a third framework, barrier, guard or bumper connected to or formed integrally with said main support member, said third framework having a channel, groove, or receiving means therein capable of receiving and retaining at least one periphery edge of a second adhesive panel to prevent said second adhesive panel from contacting the support structure and other foreign surfaces.

17. The apparatus of claim 16, wherein said first framework receives and retains at least two periphery edges of said first adhesive panel.

18. The apparatus of claim 16, wherein said second framework receives and retains at least two periphery edges of said second adhesive panel.

19. The apparatus of claim 7, wherein said third framework receives and retains at least two periphery edges of said attractant panel.

20. A method for attracting, trapping, and retaining insects for later inspection and disposal comprising the steps of:

(a) applying or impregnating an olfactory panel with an insect attractant that is capable of emitting an odor to activate olfactory senses of the insects to lure the insects to the panel;

(b) applying or impregnating an adhesive panel with a sticky, tacky or adhesive substance capable of capturing and retaining the insects that contact therewith, the adhesive panel having two or more sides thereof which can be exposed to the insects, the adhesive substance being applied to or impregnated in at least two sides of the adhesive panel, the adhesive panel being rigid or semi-rigid;

(c) removably securing the olfactory panel to a housing; and (d) removably securing the adhesive panel to the housing in such a manner that the adhesive panel has a spaced, generally parallel orientation with respect to the olfactory panel, the adhesive panel forming a substantial portion of an outwardly exposed exterior surface against which the insects may contact, the adhesive panel also forming a substantial portion of an inwardly exposed interior surface that is positioned toward the olfactory panel, the spaced orientation between the adhesive panel and the olfactory panel permitting insects to pass therebetween and contact the inwardly exposed interior surface of the adhesive panel to be captured thereby.

21. The method of claim 20, further comprising the step of removing the adhesive panel for inspection and removal of the insects captured thereupon while retaining the olfactory panel within the housing.

22. The method of claim 21, further comprising the step of replacing the adhesive panel removably secured to the housing without necessarily removing the olfactory panel from the housing.

23. The method of claim 21, further comprising the step of replacing the olfactory panel removably secured to the housing without necessarily removing the adhesive panel from the housing.

* * * * *

UNITED STATES PATENT AND TRADEMARK OFFICE
CERTIFICATE OF CORRECTION

PATENT NO. : 5,713,153
DATED      : February 3, 1998
INVENTOR(S) : John M. Cook and Roy T. Cunningham It is certified that error appears in the above-identified patent and that said Letters Patent is hereby corrected as shown below:

Column 11, line 62, insert a period (.) after the number 50.

Column 17, line 34, insert a comma after the word "panel".

Column 17, line 35, between the words "attractant" and "at" insert the word --having--.

Column 20, line 19, delete "7" and insert therefor --16--.

Signed and Sealed this

Twenty-first Day of April, 1998

Attest:

BRUCE LEHMAN

Attesting Officer

Commissioner of Patents and Trademarks